May 17, 1938.   M. VAN METER   2,117,925
AUTOMOBILE BRAKE MECHANISM
Filed Feb. 18, 1935
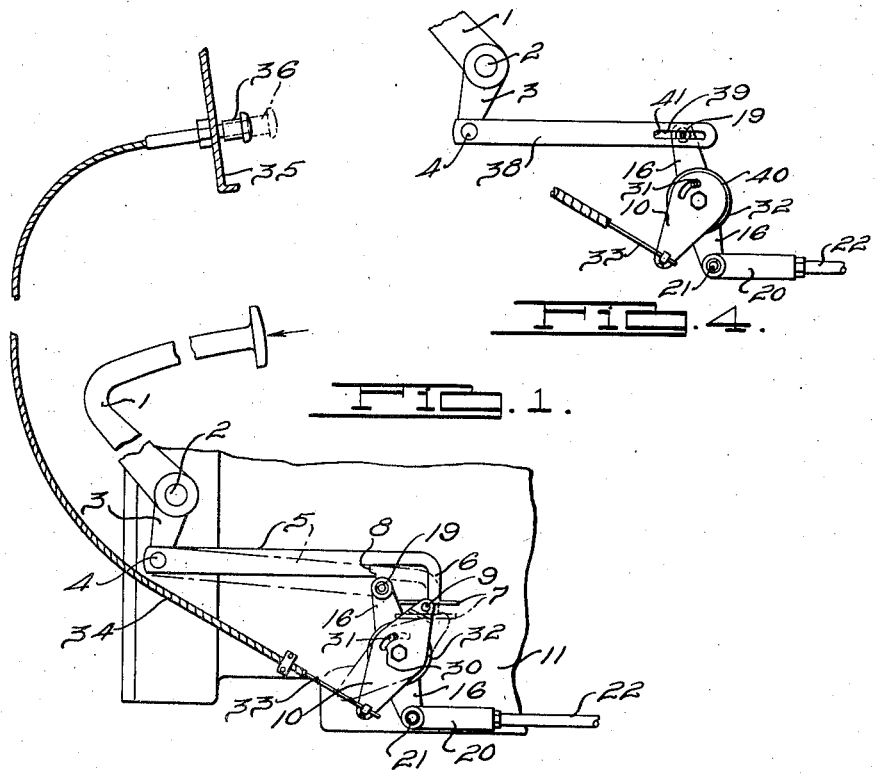
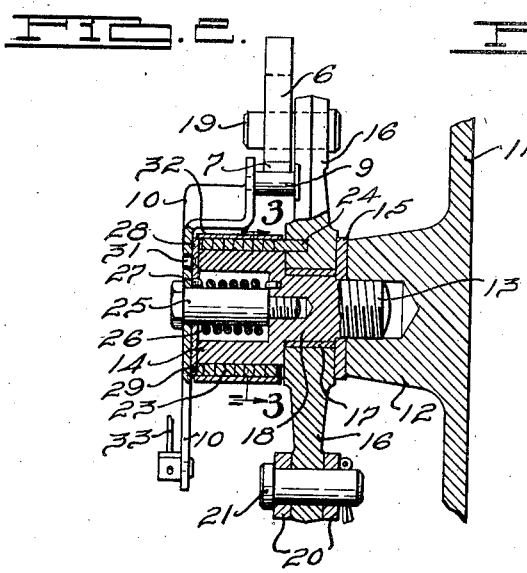
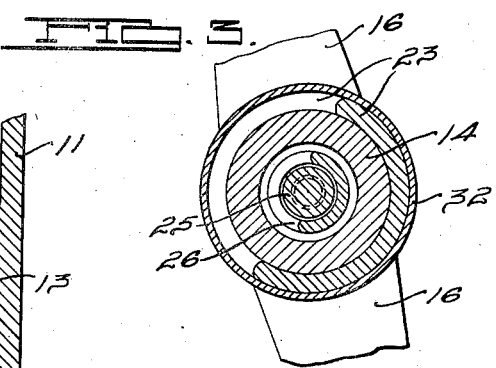
INVENTOR.
Morton Van Meter
BY
ATTORNEY.

Patented May 17, 1938

2,117,925

UNITED STATES PATENT OFFICE 2,117,925

AUTOMOBILE BRAKE MECHANISM

Morton Van Meter, Grosse Pointe Park, Mich., assignor to The Logan Gear Company, Toledo, Ohio, a corporation of Ohio Application February 18, 1935, Serial No. 6,926

11 Claims. (Cl. 192—13)

This invention relates to automobile brake mechanisms and the object of the invention is to provide a mechanism for applying the brakes of an automobile and an independent control for releasing the brakes.

Another object of the invention is to provide an automobile brake mechanism for setting the emergency brakes on an automobile and arranged so that the brakes may be set with a pedal and, after being set, the pedal may be released without releasing the brakes.

A further object of the invention is to provide an emergency brake mechanism which may be set with a pedal and which may be released independently by remote control.

Another object of the invention is to provide a constriction spring clutch which is inoperative as the brakes are applied but is operative to prevent release of the brakes, the constriction spring clutch being releasable by remote control means to allow release of the brakes.

A further object of the invention is to provide a control plate which normally prevents the pedal from operating the brakes until the control plate is turned by an independent control means.

These objects and the several novel features of the invention are hereinafter more fully described and claimed and the preferred form of construction by which these objects are attained is shown in the accompanying drawing in which—

Fig. 1 is an elevation of an automobile brake mechanism embodying my invention.

Fig. 2 is an enlarged section through the device.

Fig. 3 is an enlarged section taken on line 3—3 of Fig. 2.

Fig. 4 illustrates an alternative pedal connection.

The usual clutch pedal 1 is shown in Fig. 1 and is connected to the clutch shaft 2 for operating the clutch. Extending from the pedal 1 is an arm 3 which is pivotally connected at 4 to a link 5. This link 5 is provided with a depending end 6 having a shoe 7 and is also provided with a brake arm engaging shoulder 8. The shoe 7, as shown in Fig. 2, rides on a pin 9 provided on the operating plate 10. The crank case 11 is shown in Fig. 2 and is provided with a boss 12 into which the threaded end 13 of a drum 14 is threaded. A washer 15 is provided on the top of the boss 12 and the brake operating arm 16 is provided with a bushing 17 riding on the cylindrical portion 18 of the drum member 14. The brake operating arm 16 at the upper end is provided with a pin 19 adapted to be engaged by the notched shoulder 8 of the link 5 and at the lower end the brake operating arm 16 is connected by means of a clevis 20 and pin 21 to the brake operating rod 22 shown in Fig. 1. The arm 16 is thus free to turn on the portion 18 of the member 14 and a constriction spring 23 is wound about the drum 14 and is provided with an end 24 anchored in the brake operating arm 16. A screw 25 extends through the recess in the center of the drum 14 and is threaded into the portion 18 of the member 14 and a spring 26 is positioned about the screw and one end thereof is anchored into the member 14, while the opposite end 27 thereof is secured in the plate 28.

This plate 28 is also welded to the last coil of the constriction spring 23 at the point 29 and the plate 28 is rotatable on the screw 25. The operating plate 10 is also rotatable on this screw and is provided with an arcuate slot 30 shown in Fig. 1 and a pin 31 is secured to the plate 28 and extends through the arcuate slot in the operating plate 10. A sheet metal housing 32 is provided about the constriction spring 23 and merely acts as a housing which is carried by the constriction spring. As shown in Fig. 1, a wire 33 is connected to one end of the operating plate 10 and extends through a flexible tubing 34 to the dash 35 of the automobile and a handle 36 is provided on the end of this wire by means of which the wire may be moved longitudinally.

To operate the device, the knob 36 is drawn outwardly to the position shown in dotted lines in Fig. 1. This turns the operating plate 10 to the position shown in dotted lines in Fig. 1 thus advancing the slot 30 ahead of the pin 31 as shown in dotted lines. As the operating plate 10 is turned, the roller 9 is lowered to lower the shoe 7 and engage the notched shoulder 8 behind the pin 19 of the brake operating arm 16. At this time, the clutch pedal 1 may be depressed with the foot turning the arm 3 in a counter-clockwise direction and also turning the brake operating arm 16 in a clockwise direction. This clockwise movement of the arm 16 tends to open up the constriction spring 23 and thus turns the constriction spring in a clockwise direction about the drum 14 without gripping the drum.

This movement of the spring is assisted by means of the energizing spring 26 which tends to turn the plate 28 in a clockwise direction and assists in moving the constriction spring 23 with the brake operating arm 16. This movement of the constriction spring moves the pin 31 toward the upper end of the slot 30 in the operating plate 10 at the time the brake is applied. As all brakes are provided with springs (not here shown) tending to release the brakes these springs tend to move the rod 22 to the right of Fig. 1 after the brakes have been applied. This movement of the rod 22 toward the right of Fig. 1 tends to turn the brake operating arm 16 in a counter-clockwise direction, thus moving the end 24 of the constriction spring 23 and causing the constriction spring to grip the drum 14. In this connection it will be noted that the energizing spring 26 tending to turn the plate 28 in a clockwise direction acts as an anchor for the end 29 of the constriction spring and consequently as the arm 16 is turned in a counter-clockwise direction the spring tends to contract slightly and thus firmly grips the drum 14. This gripping action of the constriction spring prevents the brakes from releasing by their springs and thus holds the brakes applied against the tension of the brake release springs. At this time, the foot pedal 1 may be released and the link 5 will simply move forward to move the shoulder 8 away from the pin 19 which remains stationary with the brake operating arm 16. Thus the brakes are applied and will remain applied until released by the remote control.

To release the brakes, it is merely necessary to push inwardly on the knob 36 by moving it to the position shown in full lines in Fig. 1. Through means of the wire 33 the operating plate 10 is thus turned from the position shown in dotted lines in Fig. 1 to that shown in full lines. This causes the upper end of the slot 30 to engage the pin 31 and turn the pin 31 and plate 28 in a counterclockwise direction which tends to expand the constriction spring 23. This releases the constriction spring from the drum 14 and allows the brake operating springs to draw the rod 22 to the right of Fig. 1 and release the brakes. This movement of the rod 22 to the right of Fig. 1 turns the brake operating arm 16 in a counterclockwise direction back to the position shown in full lines in Fig. 1 and due to connection of the operating arm 16 with the constriction spring, the constriction spring is turned with the said arm about the stationary drum 14.

An alternative form of the structure is shown in Fig. 4 in which the arm 3 is provided with a link 38 pivotally connected thereto. This link 38 is provided with a slot 39 through which the pin 19 on the brake operating arm 16 extends. In this case, the upper end of the operating plate 10 is rounded at 40 and is not provided with a pin 9 and the link is not provided with a shoe riding on the pin. In all other respects, the device shown in Fig. 4 is the same as that shown in Fig. 1.

In the operation of the device shown in Fig. 4, depression of the clutch pedal will turn the arm 3 to move the link 38 to the right of Fig. 4 and the clutch pedal is so arranged that the clutch is first released and then as the clutch pedal is further depressed, the end 41 of the slot 39 engages the pin 19 and turns the brake operating arm 16 to apply the brakes. This rotation of arm 16 causes spring 23 to rotate carrying with it disc 28 and also arm 10 thus pushing the wire 33 and moving control button 36 to the position shown in the dotted lines in Fig. 1. The brake operating arm will remain in the position in which the brakes are applied and the clutch pedal will return to its original position when released due to the length of the slot 39. To release the brakes, it is only necessary to push on wire 33 as hereinbefore described. By this arrangement, the clutch pedal may be partly depressed to release the clutch without setting the brakes but may be further depressed to set the brakes. By providing the plate 10 with an arcuate slot the button 36 may be moved to the position shown in dotted lines in Fig. 1 before the pedal 1 is depressed to operate the lever 16.

Having thus fully described my invention, its utility and mode of operation, what I claim and desire to secure by Letters Patent of the United States is—

1. In an automobile brake mechanism, a brake, means for applying the brake, a constriction coil for holding the brake applied and a control means independent of the applying means for operating the constriction coil to release the brake, and means associated with the control means for holding the brake applying means inoperative to apply the brake upon operation of the control means to release the brake.

2. In an automobile brake mechanism, a brake, a clutch, a clutch operating pedal, a normally inoperative connection between the brake and clutch operating pedal, a control capable of making the connection operative, means for holding the brake applied, the control means being also capable of operating the holding means to release the brake.

3. In an automobile brake mechanism, a brake, a clutch, a clutch operating pedal, a connection between the brake and pedal, said connection being normally inoperative, remote control means for making the connection operative for movement of the pedal in one direction but inoperative for movement of the pedal in the opposite direction.

4. In an automobile brake mechanism, a brake, means for applying the brake, a control means wholly independent of the brake applying means for releasing the brake and preventing or permitting application of the brake through operation of the brake applying means.

5. In an automobile brake mechanism, a brake, a pedal, means connected with the pedal whereby operation thereof may apply the brake, a control means including a coil clutch for holding the brake applied, and a flexible wire controlled means for operating the clutch independently of the brake applying means to hold the brake applied or to release the brake under control of the clutch and render the means connected with the pedal inoperative to apply the brake.

6. In an automobile brake mechanism, a brake, a brake pedal, a brake holding means, means intermediate the pedal and the holding means for setting the holding means by operation of the brake pedal, and a manually controlled means independent of the pedal for holding the said intermediate means in operative or non-operative position.

7. In an automobile brake mechanism, a brake, a pedal, means for operatively connecting the pedal and brake for pedal movement in one direction to apply the brake, a constriction coil for holding the brake applied, said means for operatively connecting the pedal and brake permitting return pedal travel without releasing the brake, and means operable independently of the pedal for applying or releasing the constriction coil from the brake holding relation and when released maintaining the said first named means inoperative.

8. In a brake mechanism, a brake, a movable pedal, means for operatively connecting the pedal and brake whereby the brake is operated by the movement of said pedal, means for holding the brake in one position, manual means independent of said pedal for controlling the operation of said holding means, and means associated with said brake holding means adapted to be moved by said manual means to render ineffective the connection between said pedal and said brake.

9. In an automobile brake mechanism, a series of brakes, means adapted to establish an operative connection with said brakes for applying the same, means for holding the brakes applied, and means independent of the brake applying means for releasing the brakes, said means controlling the operative connection of said brake applying means and said brakes.

10. In an automobile brake mechanism, a brake, a brake applying means, means associated with said brake applying means for establishing an operative connection between said brake and said means for applying the brake; means for holding the brake applied, a flexible wire manually operable, and means connected with said wire to release the holding means and render the operative connection of the brake and brake applying means ineffective when the holding means is released.

11. A brake mechanism for automobiles including a steering wheel, a brake, a pedal having an operative connection with said brake for applying the brake, and an independent manual control for releasing the brake, said manual control being mounted adjacent said steering wheel and governing the release movement of the brake and the operative connection of the pedal and brake.

MORTON VAN METER.